June 21, 1949.　　　　L. E. BARTON　　　　2,473,846
ELECTROACOUSTIC TRANSDUCER
Original Filed Nov. 30, 1942　　　　　　2 Sheets-Sheet 2
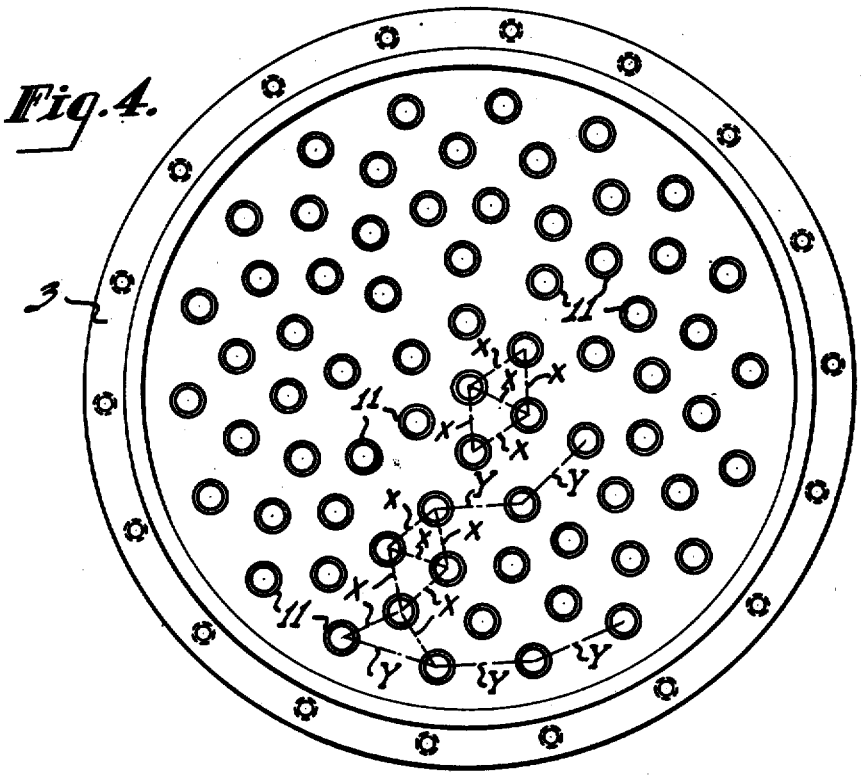
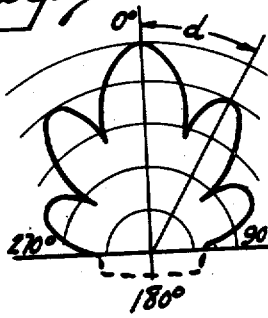 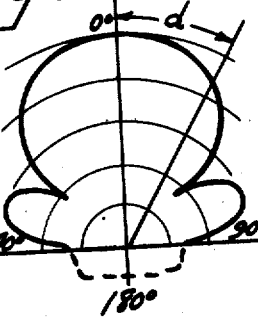 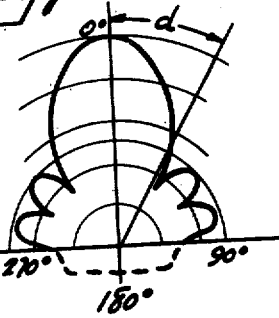
INVENTOR.
Loy E. Barton
BY
ATTORNEY Patented June 21, 1949

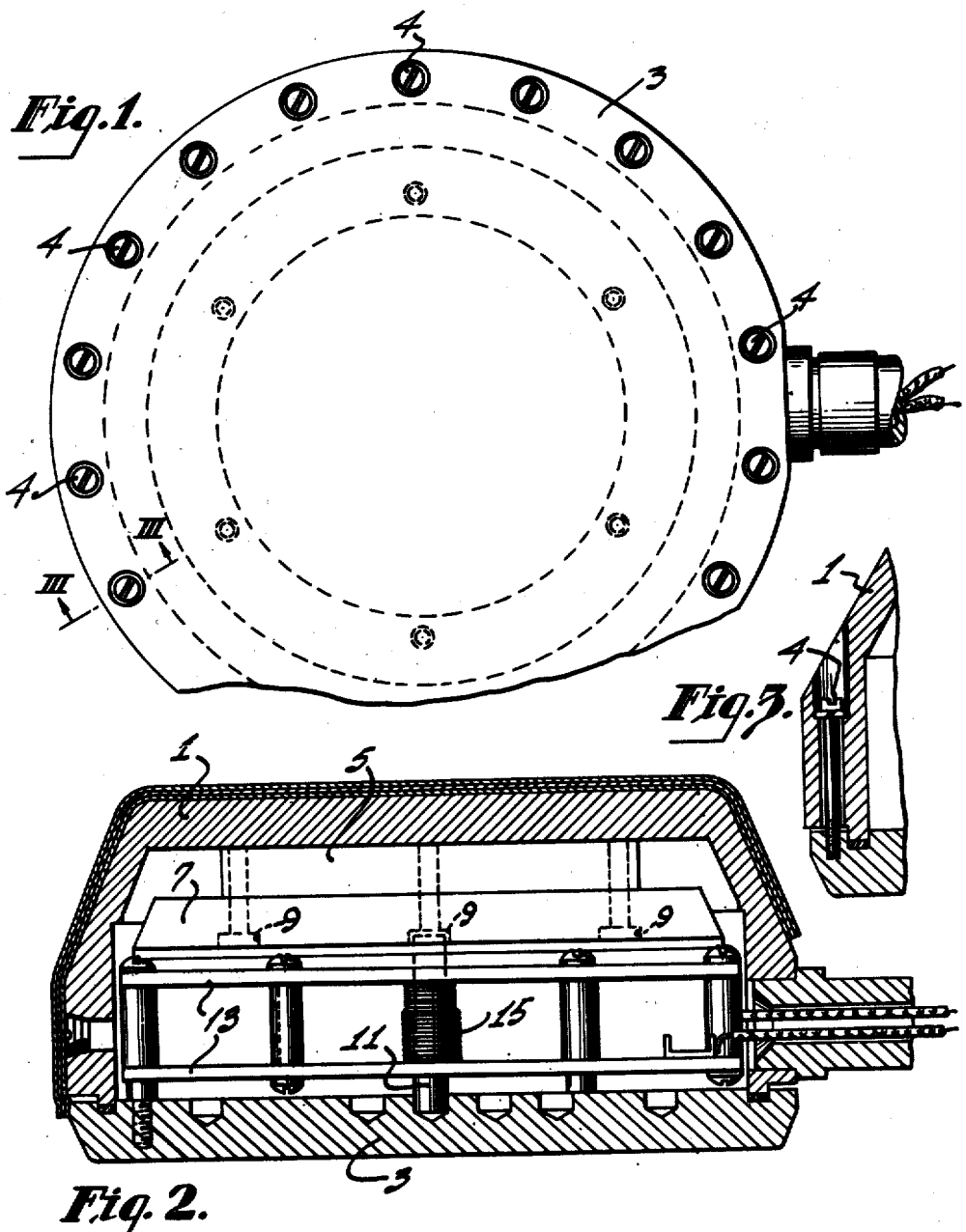

2,473,846

UNITED STATES PATENT OFFICE 2,473,846

ELECTROACOUSTIC TRANSDUCER

Loy E. Barton, Princeton, N. J., assignor to Radio Corporation of America, a corporation of Delaware Original application November 30, 1942, Serial No. 467,458, now Patent No. 2,450,104, dated September 28, 1948. Divided and this application June 2, 1947, Serial No. 751,745

7 Claims. (Cl. 177—386)

This invention relates to signalling apparatus, and more particularly to electroacoustic transducers of the magnetostrictive type used especially in submarine signalling, the present application being a division of my copending application Serial No. 467,458, filed November 30, 1942, now Patent No. 2,450,104, granted September 28, 1948.

In apparatus of this type, there is usually provided a hollow casting having an open end which is closed off by an acoustical diaphragm of substantial thickness. Secured to the diaphragm are a plurality of magnetostrictive elements which extend from the diaphragm into cooperative relation with a suitable magnetic member, each of the elements being surrounded by a coil or winding through which signal currents pass. The device may be used either to translate electrical signals into acoustical signals, in which case it acts as a transmitter, or it may translate acoustical energy into electrical signals, in which case it acts as a receiver.

The efficiency of apparatus of this sort is dependent largely upon the efficiency with which the impedance of the vibrative magnetostrictive elements is matched to the impedance of the medium surrounding the casing and the diaphragm, usually water. Heretofore, in order to increase the efficiency of such apparatus, it has been customary to thin out the edge of the diaphragm so that it would vibrate more freely, and the magnetostrictive elements, usually nickel tubes, were placed on the diaphragm in spaced relation to the thinned edge thereof, in some cases a very substantial distance. I have found that, contrary to popular belief, it is not necessary to thin out the diaphragm for best results and that the efficiency of coupling is dependent upon the manner in which the magnetostrictive tubes are placed around the diaphragm. In one case, for example, I have found that the diaphragm is not active more than about ¼" away from each tube, and if the diaphragm is extended beyond this point, an actual loss of output occurs. I have found, further, that thinning the edge of the diaphragm is not necessary and is actually detrimental from a mechanical standpoint.

With the aforementioned in mind, the primary obect of my present invention is to provide an improved signal translating device of the magnetostrictive type which is compact in construction and highly efficient in use.

More particularly, it is an object of my present invention to provide an improved magnetostrictive transducer wherein the magnetostrictive elements and the diaphragm are so related as to provide maximum output.

Another object of my present invention is to provide an improved magnetostrictive transducer as aforesaid which is relatively simple in construction and inexpensive in cost.

Still another object of my present invention is to provide an improved magnetostrictive transducer having a highly directional response characteristic.

In accordance with this invention, the magnetostrictive elements are arranged in a plurality of concentric, circular rows on the diaphragm and are spaced apart from each other a distance such that each element will cooperate with a predetermined portion of the diaphragm. For best results, the mass of each of said diaphragm portions should be from approximately four to seven times the mass of the magnetostrictive element which cooperates therewith. For a diaphragm made of soft steel and having a thickness of about ¾" to which are coupled magnetostrictive nickel tubes of approximately ⅜" outside diameter and with a wall thickness of about 20 mils, the area of the portion of the diaphragm with which each tube cooperates has a radius of approximately ¼" greater than the outside radius of the tubes. Thus, there is no need to place the tubes closer to each other than approximately ½".

It will be apparent that each succeeding outer row will have the tubular elements therein spaced at a somewhat greater distance than the next adjacent inner row. The result of this arrangement is that, if the aforementioned spacing is observed, several of the outer rows will cooperate with an annular portion of the diaphragm to impart thereto a relatively wide directional pattern, and the remaining, inner rows of tubes will cooperate with the central portion of the diaphragm to impart thereto a somewhat different directional pattern. The two patterns, however, combine to impart to the whole diaphragm a highly directional characteristic, which is very desirable.

The novel features that I consider characteristic of my invention are set forth with particularity in the appended claims. The invention itself, however, both as to its organization and method of operation, as well as additional objects and advantages thereof, will best be understood from the following description of one embodiment thereof, when read in connection with the accompanying drawings, in which Figure 1 is a bottom plan view of a transducer formed in accordance with my present invention, Figure 2 is a central sectional view thereof, Figure 3 is a fragmentary sectional view taken on the line III—III in Fig. 1, Figure 4 is a plan view of the diaphragm of this transducer with the magnetostrictive elements secured to the diaphragm, and Figures 5, 6 and 7 are directional patterns indicating the response characteristics of various portions of the diaphragm as well as of the diaphragm as a whole.

Referring more particularly to the drawings, wherein similar reference characters designate corresponding parts throughout, there is shown a transducer comprising a normally open ended casing 1, the open end of which is closed by a diaphragm 3 of magnetic material. The diaphragm 3 may be secured to the casing 1 in any suitable manner, as by a plurality of bolts 4. Secured to the casing 1 is a magnet 5 to which, in turn, is secured a plate 7 of magnetic material having a plurality of bores or openings 9 therein extending thereinto a distance less than the thickness thereof.

Secured to the diaphragm 3 at spaced points thereon in a plurality of concentric rows, and extending in parallel directions, are a plurality of magnetostrictive tubular elements 11 which may be of nickel, nickel-steel, or any other suitable material. The elements 11 extend through aligned openings in a pair of non-magnetic, spaced plates 13 carried by the diaphragm 3, and each of the tubes 11 has surrounding it a coil or winding 15 disposed between the non-magnetic plates 13. The free ends of the elements 11 extend into the openings 9 a distance slightly less than the depth of the openings 9 and with a slight clearance between the outside surface of the tubes 11 and the portions of the magnetic member 7 which define the openings 9. This clearance is very slight so as to provide good magnetic coupling between the plate member 7 and the magnetostrictive elements 11.

The windings 15 may be coupled to a suitable oscillation generator which supplies signals thereto, for example, at a frequency of 25 kilocycles per second. This renders the tubular elements 11 active magnetostrictively to produce vibration of the diaphragm 3 for sending out a high frequency signal. The diaphragm 3 may also be subjected to vibration by an incoming acoustic signal, which produces vibration of the elements 11, to thereby set up corresponding electrical impulses in the windings 15. These impulses may be amplified and reproduced in well known manner.

As pointed out heretofore, it is essential that the impedance of the vibrating tubes or elements 11 be matched to the impedance of the medium in which the transducer is immersed (for example, sea water). For this purpose, each tube or element 11 is arranged to cooperate with a portion of the diaphragm 3 such that the ratio of the mass of any particular portion of the diaphragm to the mass of the cooperating element will provide a transformer action which will afford the desired impedance matching. I have found that if this ratio is from about 4/1 to 7/1, depending upon the particular materials of which the tubes 11 and diaphragm 3 are made, the diameter and wall thickness of each tube, and the thickness of the diaphragm, most efficient coupling will be obtained. For example, where the diaphragm 3 is made of soft steel and has a thickness of ¾", and the tubes 11 are made of nickel with an outside diameter of approximately ⅜" and a wall thickness of about 20 mils, the mass of the portion of the diaphragm which cooperates with each tube 11 is about five and one-half times the mass of the associated tubular element. In an arrangement of this sort, the diaphragm is not active over an area more than about ¼" from the nickel tubes in a radial direction. Hence, by placing the tubes 11 so that their outer surfaces are ½" from each other, the respective spheres of influence of adjacent tubes 11 are tangent to each other and substantially the entire area of the diaphragm 3 is thus covered without overlapping of the areas over which the tubes 11 are effective.

With an arrangement as above described, since the nickel tubes are arranged in circular rows, it is apparent that the desired separation of nickel tubes cannot be maintained exactly in each row. Thus, for example, in the four outer rows, illustrated in Fig. 4, the elements spaced on the centers represented by the lines X are spaced apart the desired distance, but their spacings on the centers represented by the lines Y are somewhat greater. As a result, it is found that the outer few rows (for example, the three outer rows shown in Fig. 4) cooperate with an annular portion of the diaphragm to provide a relatively wide directional pattern such as shown in Fig. 5, whereas the innermost rows of elements 11 cooperate with the central, piston-like portion of the diaphragm 3 to provide a directional pattern such as shown in Fig. 6. It is found, however, that the two patterns are superimposed on each other and that the lobes in Fig. 5 at the angle α are out of phase with the output at the corresponding angle in Fig. 6, wherefore, on the vertical axis, the two patterns will be additive, while at the angle α the output is partially or entirely balanced. The resultant pattern, which is illustrated in Fig. 7, is more peaked at the axis and has greatly reduced lobes. Thus, the diaphragm operates with a highly directional pattern.

Although I have shown and described but a single modification of my invention, it will be apparent to those skilled in the art that many variations thereof are possible. It should be understood that the particular dimensions herein given are merely illustrative and are not intended to be limiting. The important thing to bear in mind is that the mechanical Q of the system, which is a measure of the damping effect, should neither be too low nor too high, or the efficiency of the apparatus will be impaired.

Inasmuch as the present invention is susceptible of various embodiments and modifications, I desire that my invention shall not be limited except insofar as is made necessary by the prior art and by the spirit of the appended claims.

I claim as my invention:

1. An electro-acoustical transducer comprising an acoustic diaphragm, and a plurality of magnetostrictive elements secured thereto at predetermined spaced points thereon, said elements being so related to said diaphragm that each of said elements cooperates with a predetermined closely adjacent mass of said diaphragm such that each of said diaphragm masses is from approximately four to seven times the mass of the element which effectively may cooperate therewith, and said elements being so arranged on said diaphragm that the active spheres of influence of adjacent ones of said elements may effectively be tangent to each other.

2. An electro-acoustical transducer comprising an acoustic diaphragm, and a plurality of magnetostrictive elements secured thereto at predetermined spaced points thereon, said elements being so related to said diaphragm that each of said elements cooperates with a predetermined closely adjacent mass of said diaphragm such that each of said diaphragm masses is approximately five and one-half times the mass of the element which effectively may cooperate therewith, and said elements being so arranged on said diaphragm that the active spheres of influence of adjacent ones of said elements may effectively be tangent to each other.

3. An electro-acoustical transducer comprising an acoustic diaphragm, and a plurality of tubular, magnetostrictive elements secured to said diaphragm at predetermined spaced points thereon, said tubular elements all extending in parallel directions and each of said elements cooperating with a predetermined closely adjacent mass of said diaphragm such that each of said diaphragm masses is approximately five and one-half times the mass of the element which effectively may cooperate therewith, and said elements being so arranged on said diaphragm that the active spheres of influence of adjacent ones of said elements may effectively be tangent to each other.

4. An electro-acoustical transducer according to claim 3 wherein each of said tubular elements cooperates with a portion of said diaphragm having an area which is concentric with the cooperating element and has a radius of a minor fractional part of an inch greater than the outside radius of said element.

5. An electro-acoustical transducer according to claim 3 wherein said elements are arranged on said diaphragm in a plurality of concentric, circular rows, and wherein each of said elements cooperates with a portion of said diaphragm having an area extending of a minor fractional part of an inch around the cooperating element.

6. An electro-acoustical transducer according to claim 3 wherein said elements are arranged on said diaphragm in a plurality of concentric, circular rows, and wherein each of said elements cooperates with a portion of said diaphragm having an area extending of a minor fractional part of an inch around the cooperating elements, said elements being further so arranged that the elements of several outer ones of said rows cooperate with an annular portion of said diaphragm to impart to said diaphragm one distribution pattern, and the elements of the remaining, inner ones of said rows cooperate with the central portion of said diaphragm to impart to said diaphragm a different distribution pattern.

7. An electro-acoustical transducer according to claim 3 wherein said elements are arranged on said diaphragm in a plurality of concentric, circular rows, and wherein each of said elements cooperates with a portion of said diaphragm having an area extending of a minor fractional part of an inch around the cooperating element, said elements being further so arranged that the elements of several outer ones of said rows cooperate with an annular portion of said diaphragm to impart to said diaphragm one distribution pattern, and the elements of the remaining, inner ones of said rows cooperate with the central portion of said diaphragm to impart to said diaphragm a different distribution pattern, said patterns being such that, when combined, they result in a relatively narrow distribution pattern for the whole diaphragm, whereby said transducer has a relatively highly directional characteristic.

LOY E. BARTON.

REFERENCES CITED

The following references are of record in the file of this patent:

UNITED STATES PATENTS

| Number | Name | Date |
| --- | --- | --- |
| 2,014,411 | Pierce | Sept. 17, 1935 |
| 2,014,413 | Pierce | Sept. 17, 1935 |
| 2,407,329 | Turner | Sept. 10, 1946 |
| 2,408,113 | Turner | Sept. 24, 1946 |